Oct. 4, 1955 L. B. PERSON 2,719,965

MAGNETIC MEMORY MATRIX WRITING SYSTEM

Original Filed March 28, 1952 2 Sheets-Sheet 1

INVENTOR
Lars B. Person
BY Morris A. Rabkin
ATTORNEY

MAGNETIC MEMORY MATRIX WRITING SYSTEM

Original Filed March 28, 1952 2 Sheets-Sheet 2

INVENTOR
Lars B. Person
BY Morris A. Rabkin
ATTORNEY

United States Patent Office 2,719,965
Patented Oct. 4, 1955

2,719,965

MAGNETIC MEMORY MATRIX WRITING SYSTEM

Lars B. Person, Stockholm, Sweden, assignor to Radio Corporation of America, a corporation of Delaware Continuation of application Serial No. 279,113, March 28, 1952. This application June 15, 1954, Serial No. 436,873

7 Claims. (Cl. 340—174)

Figure 1:
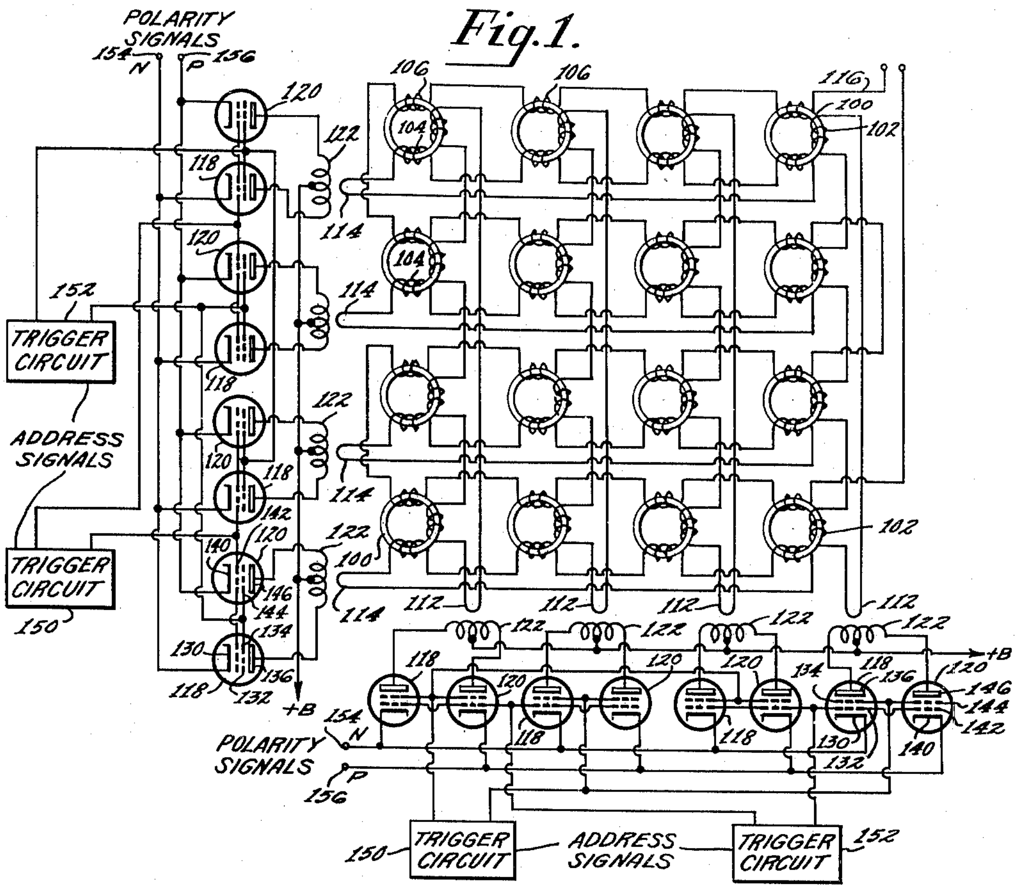

This invention relates to static magnetic information storage systems and more particularly to a test writing system for such systems.

This application is a continuation of my copending application Serial No. 279,113, filed March 28, 1952, entitled "Magnetic Memory Matrix Writing System."

Static magnetic information systems of the type contemplated herein may be found described in an artlcle in the "Journal of Applied Physics," by Jay W. Forrester, January 1951, volume 22, No. 1, entitled "Digital information storage in three dimensions using magnetic cores." The storage of bits of information is made by using toroidal cores of magnetic material having substantially rectangular hysteresis loops. One direction of magnetization of the core is usually referred to as the "P" direction and the other as the "N" direction. The direction of magnetization of a core is made representative of a binary digit one or zero. A two-dimensional array of these cores is provided wherein the cores are arranged in columns and rows. All the cores in each row are inductively coupled to a separate row coil. All the cores in each column are inductively coupled to a separate column coil. A reading coil consisting of the series connection of a winding on every core is also provided. When a current is simultaneously applied to both a row and a column coil only the core which is inductively coupled to both these coils is driven to have a direction of magnetization determined by the direction of the current flow through the coil windings. The current applied to each coil is less than that required to cause a core coupled to one excited coil to turn over, but is sufficient so that an element coupled to both an excited row and column coil is driven sufficiently to turn over if drive is in the right direction. Reading is performed by applying a driving magnetomotive force to an element in a given direction. If the element is already in the condition of magnetization to which the driving magnetomotive force is directed, there is very little flux change in the element and substantially no voltage induced in the reading coil. If the element is not magnetized in the same direction as the drive, it is driven in that direction, a large flux change occurs and a large current pulse is induced in the reading coil. Thus the presence or absence of an output in the reading coil is indicative of the condition of the element being read. Since, in interrogating a core, its information may be destroyed, provision is made, where there is an output in the reading coil to restore a core to its original condition.

It is useful, as well as convenient for testing its satisfactory operation, to display the information contained in a magnetic information holding matrix in a visible form such as on the screen of a cathode ray tube. This may be conveniently done by sequentially interrogating each one of the cores. The electron beam of a cathode ray tube is deflected vertically and horizontally so that each position of the beam corresponds in position to that of a core being read. The reading signal from the core being read is used to modulate the intensity of the beam, thus providing visible evidence of its condition. Such a system can display whatever pattern of information exists in a complete magnetic memory matrix. The result of the interrogation is used where the reading changes the core condition, to restore the core to its "pre-read" state. A system for doing this may be found described and claimed in an application by Jan A. Rajchman, Serial No. 187,733, filed September 30, 1950, and assigned to this assignee, for a "Random Access Magnetic Matrix Memory."

In order to display the entire pattern of information within a convenient time and to avoid undue flicker, the scanning of a magnetic memory matrix must be done in a time shorter than or equal to the visual persistance of the phosphors usually used in a cathode ray tube. For testing any single core or the operation of the entire memory it is desirable to "write" into the memory while it is being scanned. In view of the required speed and continuity of the scan it is difficult to synchronize, at any particular address, a writing operation that permits a manual control of the polarity of registry. Furthermore, if the scanning speed is slowed down enough for manual control, then the geometrical position of the core, or rather its representation on the screen of the CRT is difficult to identify.

An object of the present invention is to provide a system for writing any desired pattern into a magnetic information holding matrix without slowing down the scanning speed or interrupting the speed of display.

Another object of the present invention is to provide a novel and useful system for writing any desired pattern into a magnetic information holding matrix of the type described.

Still another object of the present invention is to provide an inexpensive system for writing any desired pattern into a magnetic information holding matrix of the type described.

These and further objects of the present invention are achieved, in a magnetic information holding matrix where each element is being scanned in sequence and the presence of a signal in the reading coil is used to restore a coil to its original polarity, by applying a probe to a selected core. This closes a single turn winding. When the selected core is driven, a voltage pulse is induced in the probe winding. The pulse in the probe is used to oppose the pulse in the reading winding. Thus the polarity restoring circuit is not operated and the core retains the polarity to which it was driven by the querying magnetomotive force. Therefore, if the cores of a matrix are initially set in a condition to provide a pulse in the reading winding when read, by inserting the probe into the desired cores of the matrix any desired storing pattern may be established. Furthermore, the storing ability of any single core may be readily determined.

Figure 2:
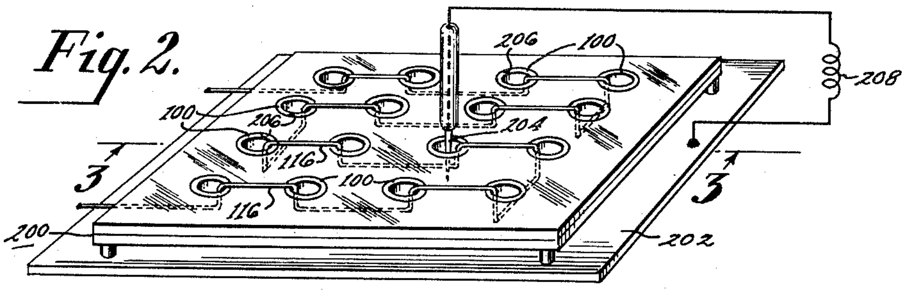
Figure 3:
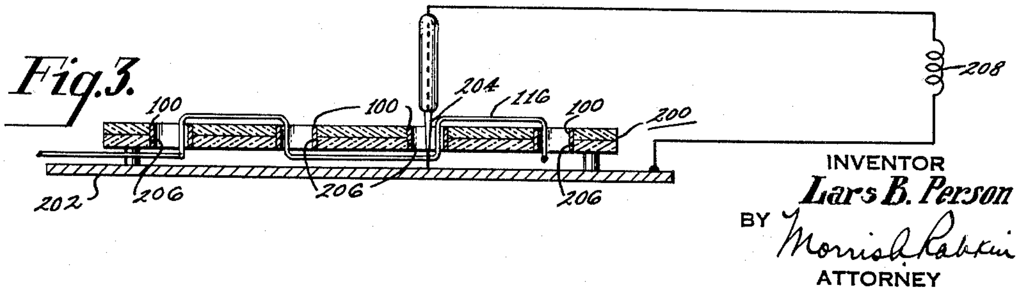
Figure 4:
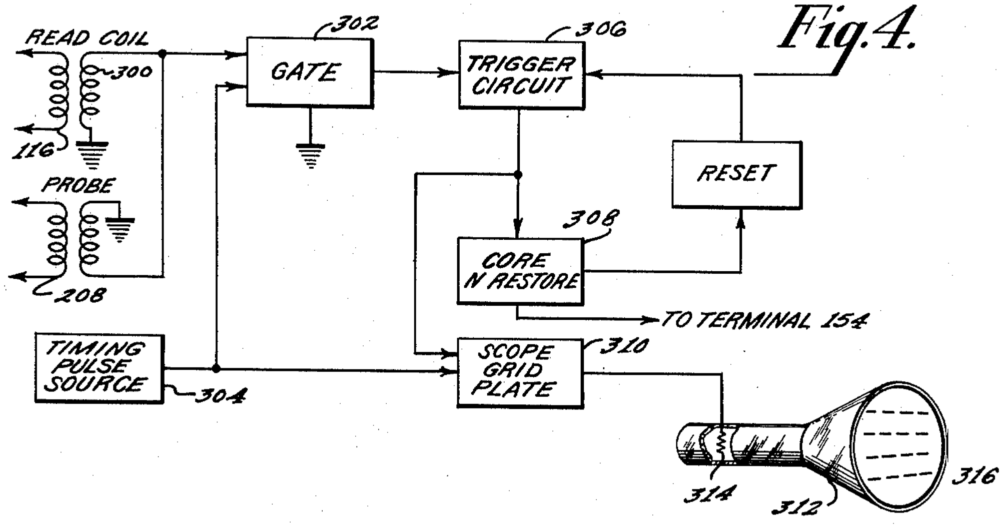
Figure 5:
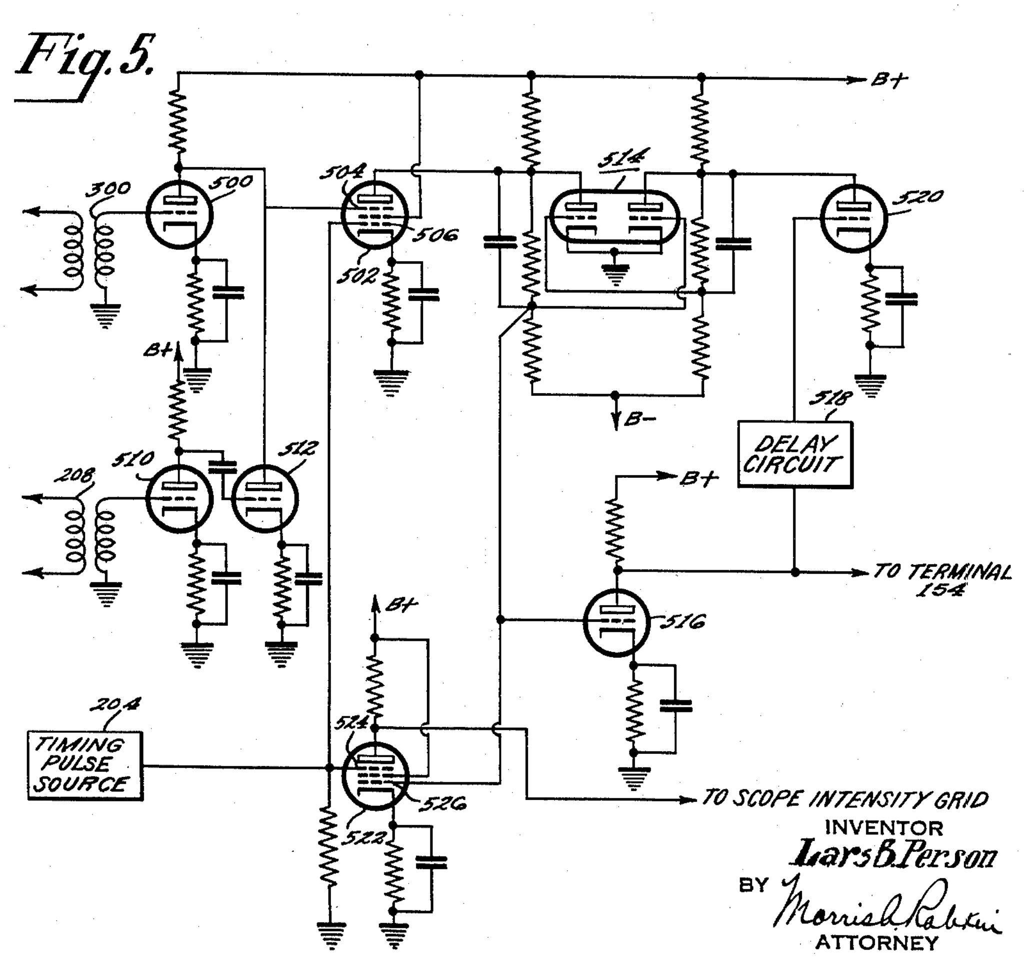

The novel features of the invention, as well as the invention itself, both as to its organization and method of operation, will best be understood from the following description, when read in connection with the accompanying drawings, in which:

Figure 1 is a circuit diagram of a magnetic information holding matrix shown to assist in an explanation of the invention, Figure 2 is a perspective view of an embodiment of the invention, Figure 3 is a cross-section of the embodiment of the invention shown in Figure 2, Figure 4 is a circuit diagram of an embodiment of the invention, and Figure 5 is a circuit diagram of the embodiment of the invention shown in Figure 4.

Referring now to Fig. 1 of the drawings, there may be seen a two-dimensional array of toroidal, saturable magnetic elements 100. Each of the elements in the columns of coils has at least one turn of wire constituting a winding around one side of the ring of the toroid. There are three such separate 102, 104, 106 windings on each core or element. First ones of these windings 102 on every element are connected in series to form a separate coil for each column which is shown as a column coil 112. Second ones 104 of these windings on every element are connected in series to form a separate coil for each row which is known as a row coil 114. The third ones 106 of the windings on every element are connected in series throughout and brought out. This third coil is the reading coil 116. The selection of a row coil 114 and a column coil 112 determines which one of the cores 100 is to receive the full excitation supplied to the selected coils. The vacuum tubes shown are illustrative of one system which may be used to drive a magnetic memory. A pair of tubes 118, 120 are shown connected to a primary winding 122 of a transformer of which a row coil 114 or a column coil 112, as the case may be, constitutes the secondary winding. The polarity of the current applied to a row coil and a column coil is determined by which one of the two tubes 118, 120 connected to a selected primary winding 122 is made to conduct. The tubes 118, 120 each have a cathode 130, 140, a first control grid 132, 142 and a second control grid 134, 144. The address, or coil selected, is determined by applying signals from the address trigger circuits 150, 152 to both the first and second control grids of two tubes 118, 120, to prime them in condition to become conductive. One pair of tubes which drives a row coil and one pair of tubes which drives a column coil are thus primed. A push-pull signal is applied to the cathodes 130, 140 of these pairs of tubes to determine which one of the pair which is primed will actually conduct. Thereby the polarity of the current in the row and column coil selected is determined. The cathodes 130 of one tube 118 in each pair are connected to a common bus and brought out to a terminal 154 to which signals are applied to render the primed tube conductive to determine the polarity as N. The cathodes 140 of the other tubes 120 are likewise connected to a bus and brought out to a terminal 156 to which signals are applied to render the primed tube conductive and determine the polarity as "P." Either a "P" or "N" signal, as the case may be, is applied simultaneously to the cathodes of the row coil driving tubes and the column coil driving tubes and accordingly the element 100 to which the selected row coil and the selected column coil are inductively coupled is driven in a P direction or an N direction.

Referring now to Fig. 2, there is shown a perspective view of an embodiment of the invention. The array of cores (an 8 x 8 array is shown for purposes of illustration) is mounted between layers 200 of a perforated non-conducting and non-magnetic material to be held in a single plane. This assembly is mounted just above a metal plate 202. A probe wire 204, the tip of which has a diameter small enough to be insertable through the openings 206 in the holding layers and the toroidal cores, may be inserted through any core 100 for the purpose of contacting the metal plate 202. The probe coil is closed when the probe wire is inserted through the core to contact the metal plate 202.

Figure 3 is a cross-section of Fig. 2, and it may be seen therein that the cores 100 are placed to be aligned with the openings 206 in the non-conductive non-magnetic materials. The cores are supported in a plane parallel to the metal plate 202. The reading coil 116 is designated by the single line passing through each one of the cores. The row and column windings are omitted to preserve simplicity in the drawing. All cores are placed in a condition N to begin with. Any core which is desired to put in condition P is so polarized by the insertion of a probe through its opening. This is immediately evidenced on the face of a display cathode ray tube (not shown) by either the presence or the absence of a spot (depending upon the polarity of the display) which is located on the screen of the tube in a position corresponding to the position of the selected core.

Referring now to Fig. 4, there is shown a schematic diagram of an embodiment of the invention. The output from the reading coil 116 is connected through a coupling coil 300 to a gate 302. This gate 302 also requires the presence of a pulse from a timing pulse source during the application of a reading pulse in order to be opened. The purpose of a timing or strobing pulse is to derive an output from the reading coil at a time which is delayed from the inception of the reading pulse in order that any unwanted signals due to the application of the querying pulses be minimized. When the gate 302 is opened, it applies a pulse to a trigger circuit 306. This trigger circuit 306 is of the type having two stable conditions. The trigger circuit is tripped to its second stable condition by the application of the pulse from the gate. The output of the trigger circuit is applied to a core N restore circuit 308. The core N restore circuit 308 applies a pulse (1) to a reset circuit which restores the trigger circuit to its first stable condition, and (2) to terminals 154 of Figure 1. This causes the core which has just been read to be restored to the condition N. It is to be understood that if, upon the reading or querying of a core, no pulse occurs in the reading coil (due to the core being in condition P), then the gate is not opened and the core which has been read remains in its condition P. The pulse from the timing pulse source 304 is also applied to an oscilloscope gate 310. This gate is opened only by the occurrence of both a timing pulse and an output from the trigger circuit. If both occur, then the oscilloscope gate 310 is opened and a pulse is provided which may be applied to the intensity control grid 314 of a cathode ray tube 312 to either brighten or blank out the cathode ray beam at that particular instant as desired.

When the probe 204 is inserted into a specific core, and the core is queried, if the core is driven to condition P from condition N, not only a pulse is induced in the reading coil 116, but also in the probe coil 208. The probe coil pulse is applied to oppose the reading coil pulse and serves to substantially nullify it. Accordingly, the gate 302 is not open. The trigger circuit 306 is not tripped and the core N restore circuit 308 is not actuated.

The core therefore remains on condition P and is not restored to condition N. The oscilloscope gate 310 is not opened. The details of the cathode ray tube 312 such as electron gun structure, power supply required, are not shown, as they are well known in the art. However, an array of bright dots 314 is shown on the screen. The dots occupy a position on the screen with reference to the other dots corresponding to the cores they represent.

Referring now to Fig. 5, a circuit diagram for accomplishing these operations may be seen therein. The reading pulse is amplified by an amplifier tube 500. It is then applied to one grid 504 of a multigrid tube 502 which acts as a gate. The output from the probe coil by an amplifier 510, inverted by an inverter stage 512 and then applied in opposition to the reading coil output by being connected to the same grid 504 of the multigrid tube. An output from the timing pulse source 204 is also applied to another grid 506 of the multigrid gate tube. The gate tube output is applied to a trigger circuit 514 which is maintained in a first stable condition with the right side tube conducting. A trigger circuit of the type shown and which may be used is found described in detail in "Time Bases," by O. S. Puckle, published by John Wiley and Sons, Inc. If the output of the gate drives the trigger circuit to its second stable condition with conduction in the left side tube, an output is applied to a core N restore tube 516 which is merely an amplifier. The output of this amplifier is applied to terminals 154 in Fig. 1, and also through a delay line circuit 518 to a reset tube 520. The reset tube serves to restore the trigger circuit to its initial stable condition. The delay line may consist of any well known electrical delay line structure such as described commencing with page 342 of "High Speed Computing Devices," by Engineering Research Associates, and published by McGraw-Hill Book Company. The oscilloscope gate consists of another multigrid tube 522 requiring the application of a timing pulse to one grid 524 and an output from the trigger circuit to a second grid 526. If this gate is opened it furnishes a pulse which may be applied to the intensity grid of an oscilloscope (not shown).

The deflection system of an oscilloscope and the type of sweep generators required in order to deflect the cathode ray beam of the oscilloscope vertically and horizontally so that the indications on the screen of the CR tube correspond to the matrix information, are not a part of this invention and will not be described in detail here. The required sweep generators are well known in the art and, for example, may be of the relaxation oscillator type found described in "Electronic Instruments," by Greenwood, Holdam and MacRae, published by McGraw-Hill Book Company, commencing with page 578. If, no example, the reading progression is made column by column, a slow horizontal sweep oscillator and fast vertical sweep oscillator may be used which are synchronized by the reading pulses.

Instead of a single manual probe insertion, there may be constructed a system where any one of a plurality of probe wires may be selectively inserted through a corresponding core by pressing an appropriate typewriter key. Each core has a probe wire partially inserted therethrough. The key completes the wire insertion and closes the probe loop.

There has been herein shown and described a novel and useful system for writing any desired pattern into a magnetic information holding matrix.

What is claimed is:

1. In a magnetic information holding system of the type having a plurality of magnetic toroidal cores arrayed in columns and rows and including means to successively read the polarity of each core, and means to restore the polarity of a core where altered by said reading, the combination therewith of means to selectively inhibit the operation of said restoring means comprising means to detect a pulse from a selected core being altered by said reading, and means to apply said pulse to said restoring means to hold said restoring means ineffective for said selected core.

2. In a magnetic information holding system of the type having a plurality of magnetic toroidal cores arranged in columns and rows and including a reading coil inductively coupled to each core, means to apply successively to each of said cores a magnetomotive force to drive a core to a given magnetic polarity, and means responsive to a voltage pulse induced in said reading coil from a core being driven to restore said core to its initial magnetic polarity, the combination therewith of means to selectively detect a pulse from a desired core being driven, and means to oppose said pulse from said reading coil with said selectively detected pulse to inhibit said means to restore said core.

3. In a magnetic information holding system of the type having a plurality of magnetic toroidal cores arrayed in columns and rows, a reading coil inductively coupled to each core and including means to apply successively to each of said cores a magnetomotive force to drive a core to a given magnetic polarity, and means responsive to a voltage pulse induced in said reading coil from a core being driven to restore said core to its initial magnetic polarity, the combination therewith of means to complete a circuit through a selected one of said toroidal cores whereby a voltage is induced in said circuit when said selected core is driven to said given magnetic polarity, and means to combine the voltage pulse induced in said reading circuit with the voltage pulse induced in said circuit to maintain said means to restore said core to its initial polarity ineffective.

4. A system as recited in claim 3 wherein said means to complete a circuit through a selected one of said toroidal cores includes a probe having a diameter sufficiently small to pass through the central opening of any one of said toroidal cores and a conductive substantially non-magnetic plate positioned on one side of the array of said cores and contacted by said probe passing through a selected one of said cores from the other side of said core.

5. In a magnetic information holding system of the type having a plurality of magnetic toroidal cores arrayed in columns and rows, a reading coil inductively coupled to each core and including means to apply successively to each of said cores a magnetomotive force of a given polarity whereby a core not having said given polarity is driven to it, thereby inducing a voltage pulse in said reading coil, and means including a bistable trigger circuit to which said reading coil pulse is applied to be tripped to provide an output whereby said driven core is restored to its initial polarity, the combination therewith of an open pickup coil having one end with a sufficiently small diameter to be insertable through one of said toroidal cores, means closing said pickup coil when said one end is inserted through a selected one of said cores whereby a voltage pulse is induced in said coil when said one core is driven, and means to oppose said reading coil pulse with said pickup coil pulse whereby said bistable trigger circuit is not tripped.

6. In a magnetic information holding system of the type having a plurality of magnetic cores and including means to read the polarity of each core, and means to restore the polarity of a core where altered by said reading, the combination therewith of means selectively to inhibit the operation of said restoring means comprising means to detect a pulse from a selected core being altered by said reading, and means to apply said pulse to said restoring means to hold said restoring means ineffective for said selected core.

7. In a magnetic information holding system of the type having a plurality of magnetic cores arrayed in columns and rows and including means to restore the polarity of each core, and means to restore the polarity of a core where altered by said reading, the combination therewith of means to selectively inhibit the operation of said restoring means comprising means to detect a pulse from a selected core being altered by said reading, and means to apply said pulse to said restoring means to hold said restoring means ineffective for said selected core.

No references cited.